May 18, 1937. C. A. RACINE ET AL Re. 20,374

METAL CONTAINER

Original Filed Dec. 21, 1931

C. A. RACINE AND
W. D. GRAHAM,
INVENTORS,
BY Marks and Clerk,
THEIR ATTORNEYS

Reissued May 18, 1937

Re. 20,374

UNITED STATES PATENT OFFICE 20,374

METAL CONTAINER

Charles Alfred Racine, Geraldton, Ontario, and William Dalton Graham, Minnedosa, Manitoba, Canada, assignors to The Sterotype Corporation, Columbus, Ohio, a corporation of Ohio Original No. 1,988,962, dated January 22, 1935, Serial No. 582,384, December 21, 1931. Application for reissue January 19, 1937, Serial No. 121,378

18 Claims. (Cl. 221—60)

The present invention relates to metal containers, especially of the hermetically sealed tubular type, having a non-removable and rotatable cap thereon, and has for its object the provision of a container the upper end of which is sealed until same is ready for use, and provided with a cap which by a turning movement shears off a portion of the sealed top of the upper end of the tube to make an aperture therethrough, making the container ready for use.

Another feature of the device is the dome-shape of the cap and its very simple construction which makes it easily manufactured and mounted on the end of the tube. The cap is preferably of harder metal than that of the tube and cannot be lost as same is non-removable from the tube. It is seen that this type of tube having a non-removable cap is preferable to the so-called "screw cap" type of tube, since the cap used with the present invention cannot be removed from the tube. It will be seen also that a tube which remains unopened and is air-tight until the contents are to be used, and in which the seal is sheared off at the first turn of the metal cap, is a distinctive advantage in this art.

Another feature of the present invention is a hanger attached to the base of the tube by which means the tube may be hung up when not in use.

In a modification of our invention is shown a second type of cap having a spring-hinged mounting on the neck of the tube, by means of which the cap cannot be lost or separated from the tube, and same also has the advantage of springing the cap into working position as soon as the holding means which holds the cap in closed position, is released.

All these features will be fully described herein as the description proceeds in this specification.

In the drawing forming part of the present specification:

Figure 2:
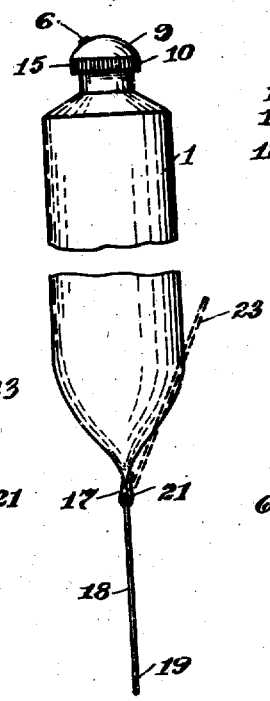
Figure 2 is a side view of Figure 1.

The numeral 1 indicates a metal tube preferably of soft material in which tooth paste, shaving cream and similar substances may be dispensed therefrom through the upper end of the tube 2. The upper end 3 of the tube 1 forms an extension with an enlarged head portion 4, and a closed top portion 5 thereon. Particular attention is drawn to the bulged portion 6 clearly illustrated in Figures 2 and 3 of the drawing of the upper end of the tube, which, it will be noted, projects through a preferably concave-shaped slot 7, and passes through the dome-shaped head 8 of the metal cap 9. The purpose of this bulged portion 6 on the upper end of the neck 3 of the tube, will be explained below.

Figure 3:
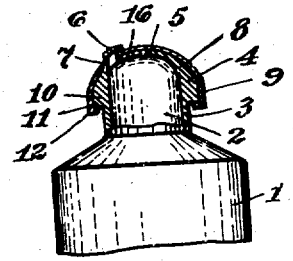
Figure 3 is an enlarged partial vertical central section of the upper portion of the tube shown in Figure 2.
Figure 4:
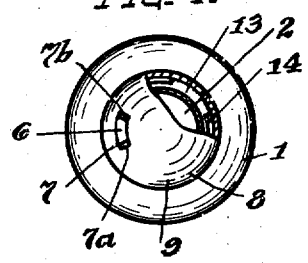
Figure 4 is a top plan view of Figure 3.
Figure 7:
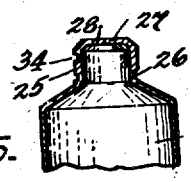
Figure 7 is a vertical central section of the tube shown in Figure 6.
Figure 6:
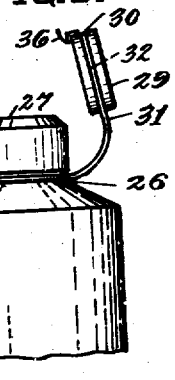
Figure 6 is a side view of Figure 5 taken from the right thereof with the spring-hinged cover in opened position.

It is seen from Figure 3 of the drawing that the neck 3 of the tube 1 is provided with an annular rim 10, which projects outwardly at 11, forming a shoulder thereon by which the metal cap 9 may be rotatably mounted on the neck of the tube 3. The metal cap is dome-shaped and formed complementary to the upper end 5 of the neck 3 of the tube, and is provided with an inwardly turned rim 12, which may be continuous forming an annular rim around the neck of the tube, or said rim 12 may be cut away as at 13, Figure 4, forming merely a plurality of prongs 14 in said rim.

The cap 9 has therein the apertured slot 7 before referred to, and before the hermetically sealed tube 1 is opened, the slot 7 surrounds the bulged portion 6 of the end 5 of the tube. The edge of the cap is preferably milled at 15, so that the same can be readily turned by manual operation. It will be seen from the drawing that as the cap 9 is of substantially harder material than that of the bulged portion 6 of the tube, upon the first revolution of the cap 9 the bulged portion 6 will be cut away leaving an aperture 16 in the upper end of tube neck 3, in which event the tooth paste or other material contained in the tube is accessible for use. The edges 7a, 7b are preferably sharpened to provide cutting edges on the cap 9 for the purpose of shearing off the projection from the end of the tube.

This arrangement of parts enables the tube to be maintained in an air-tight condition until the contents are to be used. It is readily understood that by revolving the aperture 7 of the cap 9 to a point diametrically opposite to the aperture 16 the cap 9 keeps the aperture 16 closed, preventing egress of the tube contents. The cap 9 is dome-shaped so that when the slot 7 is in the position last described, the aperture 6 is in a position as remote as possible from the aperture 16 of the tube so that any material within the tube can only find an exit by travelling along the dome-shaped top 5 of the tube neck 3 to the aperture 7.

Figure 1:
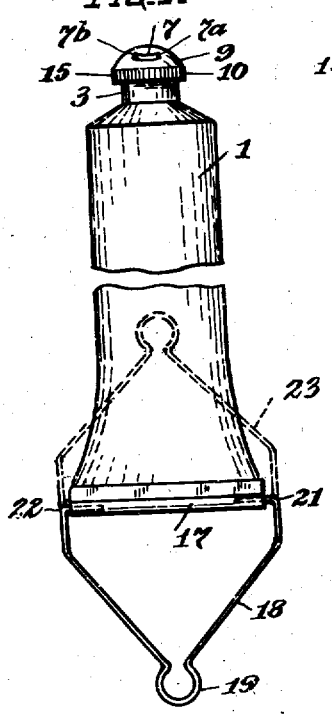
Figure 1 is a front view in elevation of the preferred form of our invention.
Figure 9:
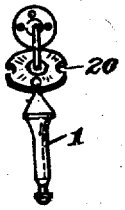
Figure 9 illustrates the tube hung in a vertical position on the disc of a common type of tooth brush holder, same being a perspective view of the device.

It will be noted that on the base 17 of the tube 1 that there is hingedly mounted a supporting wire 18 having a bulged portion 19, adapted to be used as a means for hanging up the tube either on a hook or in the slot of a tooth brush holder 20, of the type shown in Figure 9. As the contents of the tube 1 are used, the lower end of the same may be rolled upon itself upwardly as seen in Figure 1, the wire 18 being loosely and revolubly mounted at points 21 and 22 on the tube. It is also seen that when the tube is shipped the wire 18 may take the dotted position 23, shown in Figure 1.

Figure 5:
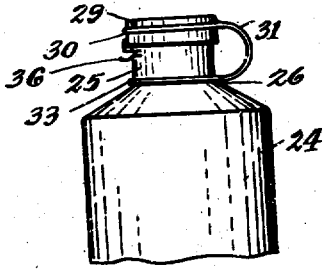
Figure 5 is a partial side view of the modified form of the container, illustrating the use of a spring actuated and retained cover, the latter being in closed position on the tube.
Figure 8:
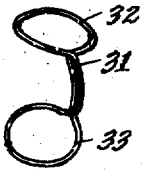
Figure 8 is a perspective view of the spring-wire used to secure the cap to the tube in the modified form of the device.

In Figures 5 to 8 inclusive of the drawing, is illustrated a modified form of container closure, in which 24 is the tube, 25 is the neck of same, which is provided with an annular exterior recess 26, and a closed end 27, which last is provided with a partially cut slot 28 for egress of the tube contents. Mounted on the tube neck 25 is the cap 29 which has an annular inwardly formed groove 30 thereabout. A spring wire 31, clearly illustrated in Figure 8 and preferably formed of a single length of wire, is used as a means of carrying the cap 29 on the neck of the tube 25. It is seen from the drawing that the cap 29 may be readily sprung into the loop 32 of the wire, and the lower loop 33 of same may be sprung about the neck of the tube 25 and lodged in the annular groove 26. A small recess 34 is provided on the one side of the neck 25 of the tube in which the spring catch 36 mounted on the cap 29 engages when the cap is in closed position, as shown in Figure 5 of the drawing. When the catch 36 is freed from the recess 34, the spring in the wire 31 immediately lifts the cap to the position shown in Figure 6. The means just described, of attaching the cap to the neck of the tube prevents the cap from being lost, and also holds same in proper position to permit the contents of the tube 24 to be ejected through the opening 28, in the upper end of the neck of the tube.

Attention is called to the fact that before the tube has been first opened, the aperture 28 is kept closed by the soft metal used for the body of the tube, but the outline of the slot 28 is partially cut through the tube material, so that by the use of a pointed instrument the aperture 28 can at once be opened ready for use. In this way a substantially hermetically sealed tube is provided, as in the case of the tube first described in this specification.

We claim:

1. In a container, a tube having a closed top thereon, a rotatable non-removable cap of comparatively hard material mounted on the top of the tube and provided with an aperture therethrough, a pair of cutting edges formed in the cap, adjacent to the cap aperture, a closed integral projection on the top of the tube of softer material than that of the cap, extending through the cap aperture, said projection being adapted to be sheared off upon revolution of the cap by the cutting edges of the same, and form an aperture in the top of the tube which can be registered with the cap aperture, for dispensing the tube contents, and which can also be placed in a position of non-alignment with the cap aperture, for preventing egress of the tube contents.

2. In a container, a tube having a closed top thereon, an integral projection of comparatively soft and thin material formed on said top portion of the tube, a rotatable non-removable cap of harder material than that of the integral projection, having an aperture therethrough surrounding the latter, a pair of sharpened, opposed cap edges adjacent to the cap aperture, adapted to shear off the projection material upon revolution of the cap, and make an aperture in the top of the tube which is registrable with the cap aperture whereby the tube contents may be dispensed.

3. In a container, a tube having a closed top thereon, an integral closed projection formed on the top portion of the tube, a rotatable non-removable cap having an aperture therethrough, surrounding the integral projection, sharpened cutting means on the cap adjacent to the cap aperture, adapted to shear off the integral projection, and make an orifice in the top of the tube when the cap is revolved for dispensing the tube contents; and detachable means mounted on the base of the tube, for suspending the tube when not in use.

4. In a container, a tube having a closed top thereon, an integral closed projection formed on the top portion of the tube, a rotatable non-removable cap having an aperture therethrough, surrounding the integral projection, and sharpened cutting means on the cap adjacent to the cap aperture, adapted to shear off the integral projection, and make an orifice in the top of the tube when the cap is revolved, for dispensing the tube contents.

5. A device including a container having a wall provided with a seating portion, said wall having an offset portion at said seating portion, and a closure member seated on the seating portion for movement along a predetermined path, said closure member having means for severing said offset portion at one point in said path to afford a discharge opening through said wall, said closure member being movable to another point in said path to close said opening.

6. A closure including a wall of a material of low shearing strength and having a seating surface, said wall having an integral closed ended thin walled projection at said seating surface, an element of thin sheet material seated on said seating surface and having an opening for receiving said projection, said element and wall being movable relatively to each other along said seating surface to cause an edge of said opening to sever said projection along the plane of the seating surface so as to afford a port in said wall, and said element being adapted to constitute a closure for said port as a result of the coaction of the wall and element at the seating surface and the relative movement therebetween, and the top of said projection lying substantially in the plane of said element.

7. A container having a closure movably mounted thereon, the closure having an opening in a wall thereof, a container sealing portion exposed through said opening, the closure having a portion adapted to engage and open said sealing portion upon movement of the closure whereby to form a discharge aperture, the closure opening being movable into and out of alignment with said aperture whereby movement of the closure may open and close the container after opening of said sealing portion.

8. A container having a closure movably mounted thereon, the closure having an opening in a wall thereof, a container sealing portion projecting through said opening and formed of material adapted to be broken by the edge of the opening in the closure upon rotation of the latter whereby to form a discharge aperture through said sealing portion, the closure opening being movable into and out of alignment with said aperture whereby movement of the closure may open and close the container after breaking of said sealing portion.

9. A container having a closure rotatably mounted thereon, the closure having an opening in a wall thereof, a container sealing wall having a portion projecting through said closure opening, said portion being positioned to be engaged and severed by an edge of the opening of the closure upon rotation of the closure whereby to form a discharge aperture through said container wall, the closure being movable subsequent to said severance to bring its opening into and out of alignment with said aperture whereby movement of the closure may open and close the container aperture.

10. A container having a closure mounting means, a closure mounted on said container for rotative movement and having an opening in a wall thereof, a container sealing wall exposed through said opening and having a portion projecting through said opening, said portion being adapted to be broken by the edge of the opening in the closure upon movement thereof to afford a discharge opening through said container wall, said closure being movable to bring the opening thereof into and out of alignment with the discharge opening whereby to open and close said opening.

11. A container having a normally closed top, a cap movably mounted on the top and provided with an opening therethrough, a projection on the top extending through said cap opening and formed of material sufficiently soft to be broken from the container by the edge of the opening in said cap upon movement of the cap whereby to form an aperture in the top of the container, the opening in said cap being adapted to be brought into and out of registry with the container aperture upon movement of the cap whereby to open and close the container.

12. A container having a closed top portion, closure mounting means on said container, a closure rotatably mounted on the container and having a wall overlying said top portion, said closure wall having an opening therethrough, a projection on said container top portion extending through said closure opening and formed of material sufficiently soft to be broken by the edge of said closure opening upon rotation of the closure, whereby to form a discharge aperture, the closure being rotatable after the projection is broken to carry the opening thereof into and out of registry with said aperture whereby to open and close the container.

13. A container having a closing wall, closure mounting means adjacent said wall, a closure mounted on said container for movement along a predetermined path, said wall having a portion in the path of movement of said closure adapted to be broken away and opened by said closure upon movement thereof along said path to form a discharge aperture, said closure being adapted to be brought into and out of closing relation with said aperture whereby to open and close the container.

14. A container having a closing wall, closure mounting means adjacent said wall, a closure mounted on said container for movement along a predetermined path, said wall having an offset portion in the path of movement of said closure adapted to be opened by said closure upon movement thereof along said path to form a discharge aperture, said closure being adapted to be brought into and out of closing relation with said aperture whereby to open and close the container.

15. A container having a wall provided with an imperforate offset portion, a closure mounted on said container for movement along a predetermined path and associated with said wall, said closure having an opening through which said offset portion extends, the edge of said opening being adapted to engage and open said offset portion upon movement of the closure and thereby to provide a discharge aperture through said offset portion.

16. A container having a wall provided with an imperforate offset portion, a closure mounted on said container for movement along a predetermined path and associated with said wall, said closure having an opening through which said offset portion extends, the edge of said opening being adapted to engage and open said offset portion upon movement of the closure and thereby to provide a discharge aperture through said offset portion, said closure being mounted for movement to carry its opening into and out of registry with said container aperture whereby to open and close the container following opening of said offset portion.

17. A container having closure mounting means, a closure mounted on said container for movement in a definite path, a container sealing wall adjacent said closure and having a portion adapted to be engaged and severed by said closure upon movement thereof in said path whereby to provide a discharge aperture, said closure having an opening adapted to be carried into and out of registry with the aperture thus formed by subsequent movement of the closure in the same path and without removal thereof from the container whereby to open and close the container upon movement of the closure.

18. A container having closure mounting means, a closure mounted on said container for movement on said mounting means, a container sealing wall adjacent said closure and having a portion adapted to be engaged and severed by said closure upon movement thereof on said mounting means whereby to provide a discharge aperture, said closure having an opening adapted to be carried by movement of the closure on said mounting means into and out of registry with the aperture thus formed and without removal thereof from the mounting means whereby to open and close the container upon movement of the closure.

CHARLES ALFRED RACINE.
WILLIAM DALTON GRAHAM.